United States Patent [19]

Dold

[11] 4,403,763

[45] Sep. 13, 1983

[54] TRANSPORT SECURING DEVICE FOR RECORD PLAYERS

[76] Inventor: Helmut Dold, Untertalstr. 23, 7743 Furtwangen 6, Fed. Rep. of Germany

[21] Appl. No.: 293,584

[22] Filed: Aug. 17, 1981

[30] Foreign Application Priority Data

May 22, 1981 [DE] Fed. Rep. of Germany ....... 3120425

[51] Int. Cl.³ ........................................... F16M 13/00
[52] U.S. Cl. .................................... 248/561; 206/320; 369/263
[58] Field of Search ................. 248/561, 544; 206/320, 206/326, 319; 369/263, 258; 403/405, 406, 408

[56] References Cited

U.S. PATENT DOCUMENTS

| 2,289,514 | 7/1942 | Mastney et al. | 248/624 |
| 2,315,398 | 3/1943 | Clark | 248/561 |
| 2,661,836 | 12/1953 | Jewell | 206/320 |
| 2,923,505 | 2/1960 | Immendorf | 248/561 |
| 3,284,085 | 11/1966 | Zimmermann et al. | 369/263 |
| 3,300,222 | 1/1967 | Scott | 369/263 |
| 3,460,210 | 8/1969 | Ellis | 369/257 |
| 3,510,137 | 5/1970 | Freier | 369/263 |
| 3,758,058 | 9/1973 | Neudeck et al. | 206/320 X |

FOREIGN PATENT DOCUMENTS

| 1176391 | 8/1964 | Fed. Rep. of Germany | 248/561 |
| 134672 | 2/1952 | Sweden | 369/263 |

Primary Examiner—James T. McCall
Assistant Examiner—David L. Talbott
Attorney, Agent, or Firm—Horst M. Kasper

[57] ABSTRACT

Transport securing device for a record player, the base plate of which rests with the interposition of elastic support elements on a mounting plate, having a spacer which is arranged movably on the base plate and protrudes below the lower edge of the base plate and, within a thread, bears a screw an enlarged foot part of which engages below the mounting plate while its head extends above the base plate and is so provided with a collar that, upon unscrewing, it clamps the base plate as well as the mounting plate separately but at the same time between itself and the spacer, the base plate not changing its position with respect to the mounting plate.

5 Claims, 4 Drawing Figures

TRANSPORT SECURING DEVICE FOR RECORD PLAYERS

The present invention relates to a transport securing device for a turntable. In known devices, the clamping of the base plate of the record player to the mounting plate has the disadvantage that the surface of the mounting plate may be damaged during transportation of the record player. Furthermore, when plastic of strong shock-absorbing action is used for the elastic elements there is the danger that these elements may be plastically deformed.

It is known (U.S. Pat. No. 2,289,514) to insert spacer members between the base plate of the record player and the mounting plate before the clamping fast of the base plate of the record player so that the base plate is not pressed against the mounting plate. However, it has been found that the handling of such spacer members is difficult when the record player is to be transported between dealer and user or between user and dealer. They are furthermore also frequently lost.

It is also known (U.S. Pat. No. 3,460,210) to connect such spacer members firmly to the mounting plate so that they cannot be lost. However, in such case it is not possible to retain the position of the base plate of the record player if the plate is to be secured for transportation so that plastic bodies of high shock-absorbing action which tend towards plastic deformation cannot be used for the elastic support of the record player, this being true in particular of more complicated plastic members in connection with which the shock-absorbing properties can be optimally adapted at little expense.

The object of the present invention is to avoid special handling of such spacer members in addition to the clamping of the base plate of the record player to the mounting plate, i.e. to bring them into and out of action without additional manipulation, without the possibility of their being lost and without the base plate of the record player having to change its location in the transport position as compared with the playing position.

The invention improves a transport securing device for a record player which rests, with the interposition of elastic support elements (15), on a mounting plate (14), having a screw (8) which is tiltably anchored in the base plate (1) of the record player and can be turned from above, said screw extending through a laterally open recess (13) in the mounting plate (14) and containing at its lower end a foot part (11) which is of larger size than said recess (13), which screw on the one hand due to its tiltable attachment can be swung laterally into the recess (13) and on the other hand by turning, cause the foot part (11) to be tightened against the mounting plate (14), characterized by the fact that the female thread for the screw (8) is located in the lower part (6) of a spacer member (7) which is arranged below the base plate (1) and the bottom side (6) of which serves, in combination with the foot part (11), to clamp the mounting plate (14) between them while its upper part contains projections (17, 18) which, passing through the base plate (1), rest loosely on it and, in combination with a lower collar (10) arranged on the screw (8) below the base plate (1), serve for clamping the base plate (1) between itself and the projections (17, 18) of the spacer member (7), and that the bottom side (6) of the spacer member (7) is arranged at such a distance from the projections (17, 18) that when the base plate (1) is clamped between them it is lower than the bottom edge (19) of the base plate (1) and the foot part (11) is also in its clamping position when the screw (8) is in this position.

Furthermore, in accordance with the invention an elastic disk (12) is arranged on the foot part (11) of the screw (8), said disk permitting the foot part (11) to lie elastically against the mounting plate (14) when the screw (8) is tightened.

Still further in accordance with the invention, the spacer member (7) is supported in raisable manner in the base plate (1) of the record player and the screw (8) is provided, above the base plate (1) of the record player, with an upper collar (9) which, when the screw (8) is screwed down or loosened, rests on the base plate (1) of the record player so that the further turning of the screw (8) effects the raising of the spacer member (7) relative to the base plate (1).

With the above and other objects and advantages in view, the present invention will become more clearly understood in connection with the detailed description of preferred embodiments, when considered with the accompanying drawing, of which:

Figure 1:
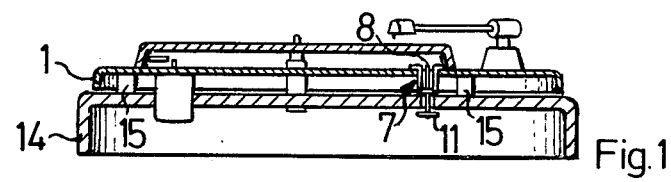
FIG. 1 is a cross sectional view through a record player.

The base plate 1 of the record player contains two openings 2, 3 through which there extend two arms 4, 5 which, together with a disk 6, which contains a female thread, form a spacer member 7. Within the female thread of the spacer member 7 there is contained the screw 8 which bears at its head end an upper collar 9 and a lower collar 10 and at its lower end a disk-shaped foot part 11 with an elastic disk 12. The lower end of the transport securing screw 8 extends through a laterally open recess 13 in the mounting plate 14. The base plate 1 of the record player rests on elastic elements 15 which are fastened to the base plate 1 and rest in recesses 16 in the mounting plate 14.

The screw 8 is inserted together with the spacer member 7 as a pre-assembled unit into the base plate 1 of the record player by introducing the arms 4, 5 of the spacer member 7, with the screw 8 screwed down, into the widened part of the openings 2, 3 in the base plate 1 and shifting them laterally until the screw 8 is aligned with a corresponding bore 1a in the base plate 1 and can be screwed upward through the bore 1a. Thereupon the upper collar 9, in the form of a disk, is placed on the screw 8.

Figure 3:
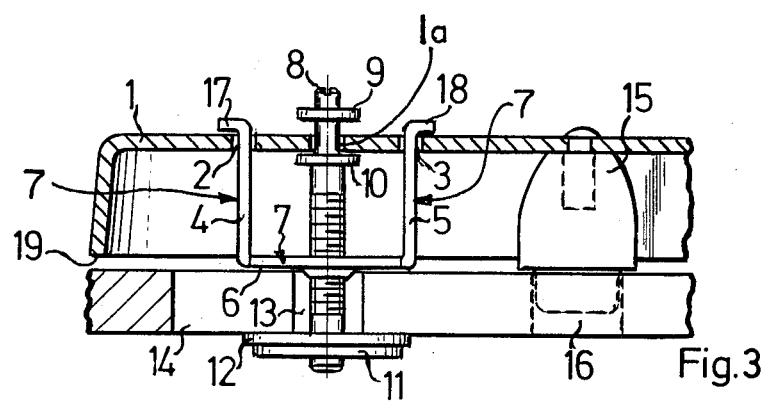
FIGS. 2 and 3 show, on a larger scale, a partial view with the transport securing screw in two different positions.

If the record player is to be secured to the mounting plate for transportation, then the screw 8 (FIG. 2) is screwed upward until its lower collar 10 rests against the base plate 1 of the record player and clamps said base plate between itself and two projections 17, 18 on the arm ends 4, 5 of the spacer member 7 (FIG. 3). The spacer member 7 is so tall that in this clamped position the bottom side of its disk 6 lies approximately in the plane of the top side of the mounting plate 14. In this position the foot plate 11 of the screw 8 lies with its elastic disk 12 against the bottom of the mounting plate 14 and clamps the latter to the spacer member 7. The position of the base plate 1 of the record player has not changed in its height with respect to the mounting plate 14 as a result of the tightening of the screw 8. Elastic disk 12 serves on the one hand for a slip-proof clamping of the spacer member 7 to the mounting plate 14 and on the other hand also to compensate for tolerances in thickness of the mounting plate 14. The latter is necessary since the clamped position of the foot part 11 of the screw 8 is determined by the resting of its lower collar 10 against the base plate 1 of the record player, while the clamped position of the spacer member 7 is determined by the resting of the projections 17, 18 of its arms 4,5 against the base plate of the record player. The equalizing of tolerances in thickness of the mounting plate 14 is also possible, for instance, by corresponding resilience of the foot part itself.

Figure 2:
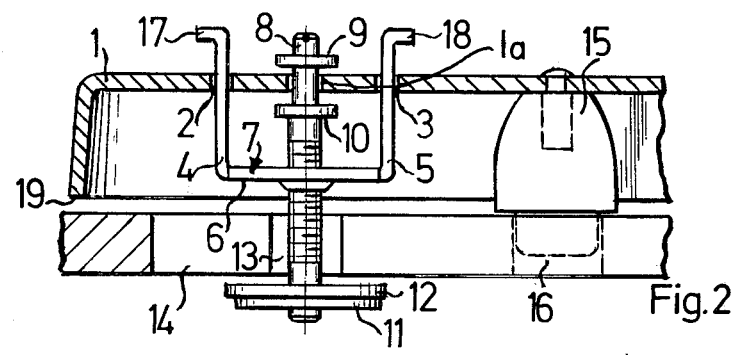
Figure 4:
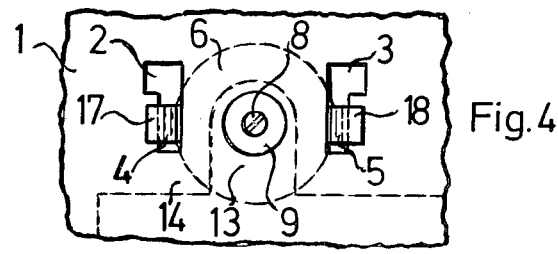
FIG. 4 is the top view of a transport securing screw according to FIGS. 2 and 3.

The upper roller 9 on the screw 8 is not absolutely necessary. However, it makes it possible for the spacer member 7 to not have its weight resting on the mounting plate 14 in its unclamped position. In order to achieve this, it is merely necessary to turn the screw 8 somewhat more than is required for its unclamping. As a result of this further rotation, its upper collar comes against the base plate 1 and from that time on the spacer member 7 starts to rise instead of the screw 8 descending further (FIG. 2).

The numerals in the claims and the specification are given only for ready reference of one example and not by limitation.

While there has been described embodiments of the invention, it is to be understood that these embodiments are given by example only and not in a limiting sense.

I claim:

1. A transportation securing device for a turntable, the base plate of which when in operating condition rests, with the interposition of elastic support elements, on a mounting plate, comprising
   a spacer member arranged substantially below the base plate of the turntable, said spacer member has a lower part and a top part, said lower part is formed with a female thread and has a bottom side projecting downwardly past a lower edge of said base plate, said spacer member including on said top part thereof upper projections which extend non-rotatably through said base plate of the turntable and rest loosely thereon,
   said base plate is formed with a bore,
   a screw seated in said female thread of the spacer member and extending upwardly through said bore formed in the base plate,
   a lower collar on said screw being larger in diameter than said bore in the base plate of the turntable and lies therebelow, and upon screwing up said screw said lower collar clamps the base plate between said lower collar and said upper projections of said spacer member,
   a foot part fastened on a lower end of said screw,
   said mounting plate is formed with a laterally open recess, said recess is smaller in diameter than that of said foot part,
   said screw is tiltably mounted on the base plate of the turntable, being swingable into and out of said laterally open recess in the mounting plate, said foot part being disposed below the mounting plate,
   said mounting plate is clampable between said bottom side of said spacer member and said foot part of said screw by said screwing up of said screw,
   said foot part of said screw is arranged at such a distance from said lower collar of said screw that upon said screwing up of said screw, said base plate of the turntable and the mounting plate are simultaneously clamped fast.

2. The transportation securing device according to claim 1, further comprising
   elastic means arranged on a top side of said foot part for elastic application of said foot part against the mounting plate when brought into clamping position.

3. The transportation securing device according to claim 1, further comprising
   longitudinal guide means in said base plate of the turntable for vertical displacement of the spacer member in an upward direction,
   an upper collar disposed on said screw above the base plate of the turntable, arranged at such a distance from said lower collar of said screw that upon screwing down and unscrewing of said screw, said upper collar rests against said base plate such that further turning of the screw causes lifting of said spacer member off from said base plate of the turntable.

4. The transportation securing device according to claim 3, wherein
   said guide means constitute openings formed in said base plate through which said upper projections of said spacer member extends.

5. The transportation securing device according to claim 4, wherein
   said openings each have a widened insert portion and an operative narrowed portion,
   said upper projections have a top flange extending laterally wider than said narrowed portion, said widened insert portion is wider than that of said top flange.

* * * * *